US009475734B2

(12) United States Patent
McCauley et al.

(10) Patent No.: US 9,475,734 B2
(45) Date of Patent: Oct. 25, 2016

(54) SHRINKAGE CONTROL IN ALUMINUM TITANATE USING CARBONATES

(75) Inventors: Daniel Edward McCauley, Watkins Glen, NY (US); Patrick David Tepesch, Corning, NY (US); Christopher John Warren, Waverly, NY (US); Jeffrey S White, Corning, NY (US)

(73) Assignee: Corning Incorporated, Corning, NY (US)

( * ) Notice: Subject to any disclaimer, the term of this patent is extended or adjusted under 35 U.S.C. 154(b) by 771 days.

(21) Appl. No.: 13/484,629

(22) Filed: May 31, 2012

(65) Prior Publication Data

US 2013/0320600 A1 Dec. 5, 2013

(51) Int. Cl.
*C04B 35/478* (2006.01)
*C04B 35/636* (2006.01)
*C04B 38/00* (2006.01)

(52) U.S. Cl.
CPC ......... *C04B 35/478* (2013.01); *C04B 35/6365* (2013.01); *C04B 38/0006* (2013.01); *C04B 2235/3206* (2013.01); *C04B 2235/3208* (2013.01); *C04B 2235/3213* (2013.01); *C04B 2235/3217* (2013.01); *C04B 2235/3227* (2013.01); *C04B 2235/3232* (2013.01); *C04B 2235/3418* (2013.01); *C04B 2235/425* (2013.01); *C04B 2235/442* (2013.01); *C04B 2235/5436* (2013.01); *C04B 2235/5463* (2013.01); *C04B 2235/5472* (2013.01); *C04B 2235/6021* (2013.01); *C04B 2235/96* (2013.01); *C04B 2235/9607* (2013.01); *C04B 2235/9615* (2013.01); *C04B 2235/9638* (2013.01)

(58) Field of Classification Search
CPC ............ C04B 35/478; C04B 38/0006; C04B 35/6565; C04B 2235/425
USPC .......................... 264/630, 631, 632, 672, 652
See application file for complete search history.

(56) References Cited

U.S. PATENT DOCUMENTS

| 4,280,845 A * | 7/1981 | Matsuhisa ................ B01J 21/14 428/116 |
| 6,468,325 B1 * | 10/2002 | Cutler et al. .................... 55/523 |
| 7,259,120 B2 | 8/2007 | Ellison et al. ................ 501/134 |
| 2006/0210822 A1 * | 9/2006 | Ono ................... B01D 39/2093 428/593 |

(Continued)

FOREIGN PATENT DOCUMENTS

| CN | 102245534 A | 11/2011 |
| CN | 101553445 B | 9/2012 |

(Continued)

OTHER PUBLICATIONS

"Influence of Aluminum Titanate Formation on Sintering of Bimodal Size-Distributed Alumina Powder Mixtures"; Taruta et al; Journal of American Ceramic Society; 80(3); p. 551-556; (1997).

(Continued)

*Primary Examiner* — Nahida Sultana
(74) *Attorney, Agent, or Firm* — Joseph M. Homa; Matthew J. Mason

(57) ABSTRACT

A method for reducing shrinkage variability of aluminum titanate honeycombs includes preparing an aluminum titanate-forming batch material that includes least one alkaline earth carbonate having a particle size distribution. The particle size distribution of the at least one alkaline earth carbonate is selected based on the predicted shrinkage during sintering of the aluminum titanate honeycombs.

11 Claims, 2 Drawing Sheets

(56) References Cited

U.S. PATENT DOCUMENTS

| | | | |
|---|---|---|---|
| 2007/0252310 A1* | 11/2007 | Brockway | B28B 11/006 264/432 |
| 2010/0044911 A1* | 2/2010 | Suwabe et al. | 264/211.11 |
| 2010/0052200 A1 | 3/2010 | Deneka et al. | |
| 2010/0086696 A1* | 4/2010 | Tokumaru | C04B 41/009 427/356 |
| 2010/0233425 A1* | 9/2010 | Suwabe | C04B 35/478 428/116 |
| 2010/0252497 A1* | 10/2010 | Ellison | C03C 8/02 210/500.1 |
| 2010/0310819 A1* | 12/2010 | Suwabe | B29C 71/02 428/116 |
| 2011/0053757 A1 | 3/2011 | Caffery et al. | 501/127 |
| 2011/0105318 A1* | 5/2011 | Raffy | 502/439 |
| 2011/0124486 A1 | 5/2011 | Gallaher et al. | 501/80 |
| 2011/0236625 A1* | 9/2011 | Kikuchi | B01D 53/9413 428/116 |
| 2011/0287921 A1* | 11/2011 | Uoe et al. | 501/32 |
| 2011/0320600 A1* | 12/2011 | Froeding et al. | 709/225 |
| 2012/0282562 A1* | 11/2012 | Narumi et al. | 432/9 |
| 2013/0269303 A1* | 10/2013 | Uoe et al. | 55/523 |
| 2013/0320600 A1* | 12/2013 | McCauley | C04B 35/478 264/630 |
| 2014/0084505 A1* | 3/2014 | Vileno et al. | 264/43 |

FOREIGN PATENT DOCUMENTS

| | | | | |
|---|---|---|---|---|
| EP | 2368866 | | 9/2011 | |
| WO | WO2010/067859 A1 | * | 6/2010 | ..... B01D 2239/1241 |
| WO | WO2010067859 | * | 6/2010 | ............ C04B 35/46 |
| WO | WO2011040457 A1 | * | 4/2011 | ............ C04B 35/46 |

OTHER PUBLICATIONS

"Microstructure control of ceramic membrane support from corundum-rutile powder mixture"; Wang et al; Powder Technology; vol. 168 (2006) 125-133.

Chinese Office Action, dated Nov. 3, 2015, pp. 1-9, Chinese Application No. 201380038712.6. The State Intellectual Property Office of the People's Republic of China.

International Search Report and the Written Opinion of the International Searching Authority; PCT/US2013/043058; Mailed Jul. 30, 2013, 13 pages.

International Preliminary Report on Patentability; PCT/US2013/043058 Mailed Dec. 11, 2014, 10 pages.

International Preliminary Report on Patentability; PCT/US2013/043058 Mailed Dec. 11, 2014.

International Search Report and the Written Opinion of the International Searching Authority; PCT/US2013/043058; Mailed Jul. 30, 2013.

* cited by examiner

SHRINKAGE CONTROL IN ALUMINUM TITANATE USING CARBONATES

FIELD

The invention relates to methods of manufacturing ceramic honeycombs, and particularly to aluminum titanate honeycombs that are manufactured with improved shrinkage control.

BACKGROUND

The ability to produce aluminum titanate honeycombs that are extruded to shape (i.e., not machined to a final dimension) is dependant upon suitably controlling the variability in how much the filter shrinks (or grows) during the sintering or firing process. Increasingly stringent diesel particulate filter (DPF) contour specifications require careful control of the shrinkage of the extruded green honeycomb.

Methods to control the extent of shrinkage variability in ceramic honeycombs include calcining and/or milling/comminuting of the batch raw materials to a defined particle size distribution prior to extrusion into the honeycomb structure. For example, in silicon carbide honeycombs, altering the silicon content has been shown to affect the shrinkage behavior. Taruta, et al., "Influence of Aluminum Titanate Formation on Sintering of Bimodal Size-Distributed Alumina Powder Mixtures," *J. Am. Ceram. Soc.,* 80 [3], 551-56 (1997) the entire disclosure of which is incorporated herein by reference, showed that shrinkage and pore size distribution can be modified and controlled by mixing coarse and fine alumina within the same composition. Wang, et al., "Microstructure of Ceramic Membrane Support from Corundum-rutile Powder Mixture," *Powder Technology,* 168, 125-133 (2006), the entire disclosure of which is incorporated herein by reference, showed that pore size distribution (pore radius) can be modified through controlled changes in batch titania, which alters the final stoichiometry. U.S. patent application nos. 2010/0052200 and 2011/0053757, the entire disclosures of which are incorporated herein by reference, disclose that shrinkage variability can be controlled by controlling the particle size distribution of graphite and/or alumina, respectively. However, there is still a portion of shrinkage variability that has not been accounted for.

Accordingly, an effective way to minimize day-to-day shrinkage variability in the large scale production of honeycombs is desired such that relatively stringent filter contour specifications may be achieved.

SUMMARY

According to a first embodiment, a method for reducing shrinkage variability of aluminum titanate honeycombs includes preparing an aluminum titanate-forming batch material. The aluminum titanate-forming batch material includes inorganic batch components that include at least one alkaline earth carbonate having a particle size distribution. The particle size distribution of the at least one alkaline earth carbonate is selected based on the predicted shrinkage during sintering of the aluminum titanate honeycombs.

Another embodiment features a method for manufacturing a porous ceramic honeycomb. The method includes, preparing an aluminum titanate-forming batch material that includes at least one alkaline earth carbonate having a particle size distribution. The method also includes forming a green body from the batch material and firing the green body to obtain a ceramic body. The particle size distribution of the at least one alkaline earth carbonate is selected based on the predicted shrinkage during sintering of the aluminum titanate honeycomb body.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

The accompanying drawings are included to provide a further understanding of the invention as claimed and are incorporated in and constitute a part of this specification. The drawings are not intended to be restrictive, but rather illustrate exemplary embodiments and, together with the description, serve to explain the principles of the invention as claimed.

DETAILED DESCRIPTION

Figure 1:
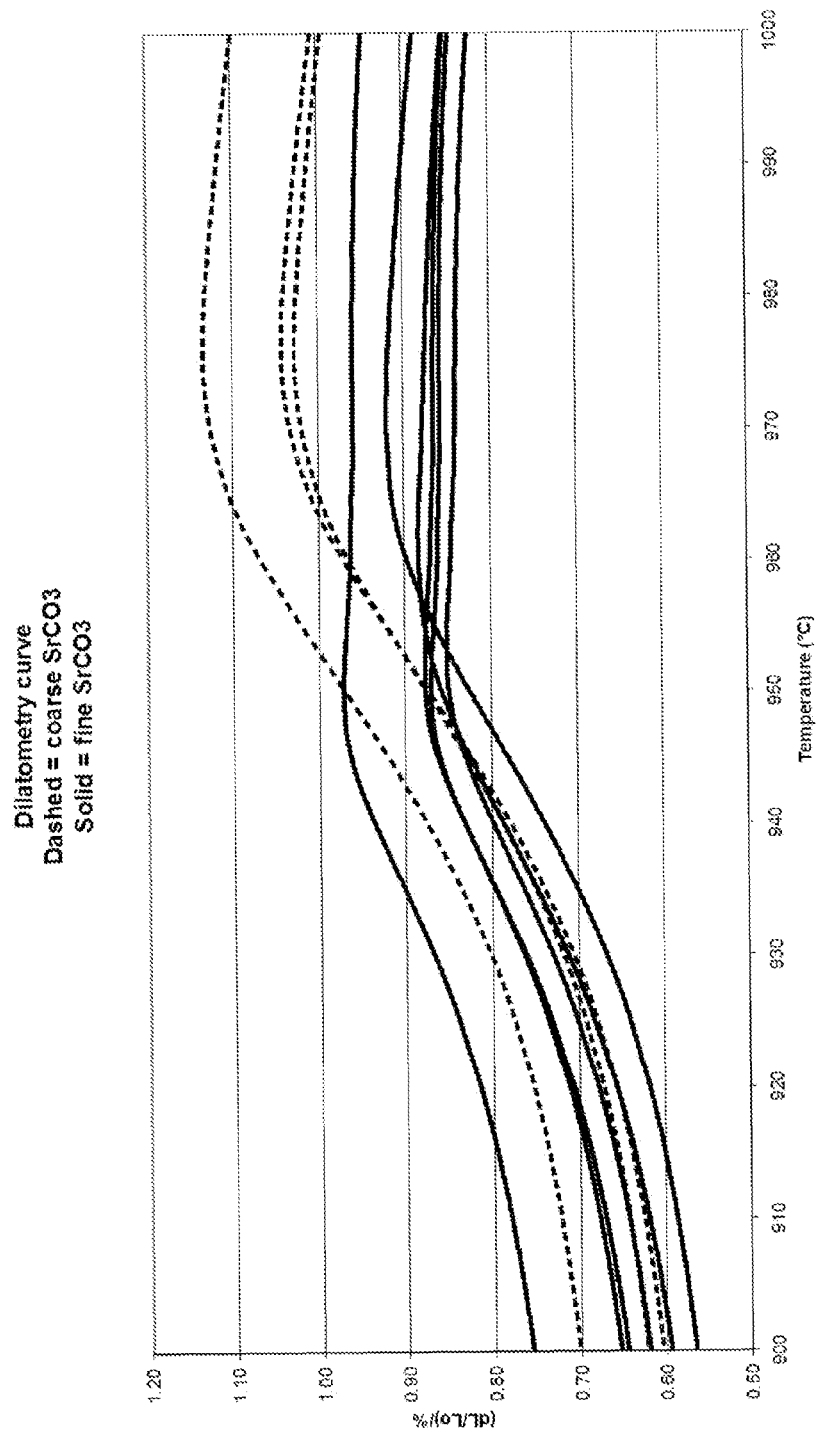
FIG. 1 plots dilatometry curves for aluminum titanate batch compositions comprising strontium carbonate having either coarse or fine particle sizes.

It is to be understood that both the foregoing general description and the following detailed description are exemplary and explanatory only, and are not restrictive of the claimed invention. Other embodiments will be apparent to those skilled in the art from consideration of the specification disclosed herein. It is intended that the specification and examples be considered as exemplary only.

As used herein, the use of "the," "a," or "an" means "at least one," and should not be limited to "only one" unless explicitly indicated to the contrary. Thus, for example, the use of "the alkaline earth carbonate" or "an alkaline earth" is intended to mean "at least one alkaline earth carbonate." Likewise, the use of "a particle size distribution" or "the particle size distribution" is intended to mean "at least one particle size distribution."

The disclosure relates to ceramic-body-forming batch materials comprising inorganic batch components comprising at least one alkaline earth carbonate.

As used herein, the terms "aluminum titanate-forming batch material," "batch material," and variations thereof, are intended to mean a substantially homogeneous mixture comprising inorganic batch components. The batch material of the present disclosure may be used to make ceramic bodies comprising aluminum titanate as a primary phase material, which may optionally include one or more secondary phase materials including, but not limited to, cordierite, mullite, alkali and alkaline-earth feldspar phases, and silicon carbide.

The inorganic batch components comprise at least one alkaline earth carbonate. Alkaline earth carbonates include those selected from the group consisting of beryllium carbonate, magnesium carbonate, calcium carbonate, strontium carbonate, and barium carbonate, such as the group consisting of magnesium carbonate, calcium carbonate and strontium carbonate and further such as the group consisting of magnesium carbonate and strontium carbonate and still further such as the group consisting of calcium carbonate and strontium carbonate. In certain exemplary embodiments, the alkaline earth carbonate comprises strontium carbonate. In certain exemplary embodiments, the alkaline earth carbonate comprises calcium carbonate. In certain exemplary embodiments, the alkaline earth carbonate comprises magnesium carbonate.

Examples of batch materials for forming aluminum titanate honeycomb DPFs are disclosed in U.S. Pat. No. 7,259,120, the entire disclosure of which is incorporated herein by reference. For example, in certain embodiments, the inorganic batch can contain from 48 to 52 wt % alumina, from 28 to 32 wt % titania, from 8 to 12 wt % silica, from 7 to 10 wt % strontium carbonate, from 1 to 3 wt % calcium carbonate, and from 0 to 1 wt % lanthanum oxide, based on the total weight of the inorganic solid components in the batch.

The ceramic-forming-batch material may further comprise a fugitive pore former. Examples of fugitive pore formers include carbon (e.g., graphite (natural or synthetic), activated carbon, petroleum coke, and carbon black), starch (e.g., corn, barley, bean, potato, rice, tapioca, pea, sago palm, wheat, canna, and walnut shell flour), and polymers (e.g., polybutylene, polymethylpentene, polyethylene (preferably beads), polypropylene (preferably beads), polystyrene, polyamides (nylons), epoxies, ABS, Acrylics, and polyesters (PET)). In at least one embodiment, the pore former may be chosen from starches. By way of example only, the pore former may be a starch chosen from potato and pea starch.

Non-limiting examples of fugitive pore formers include Native Potato Starch marketed by Emsland Starke GmbH from Kyrita and Emlichheim, Germany facilities and Native Pea Starch marketed by Emsland Starke GmbH from the Emlichheim, Germany facility.

In various exemplary embodiments, the fugitive pore former may be chosen to be present in any amount to achieve a desired result. For example, the fugitive pore former may comprise at least 1 wt % of the batch material, added as a super-addition (i.e., the inorganic components comprise 100% of the batch material, such that the total batch material is 101%). For example, the fugitive pore former may comprise at least 5 wt %, at least 10 wt %, at least 15 wt %, at least 20 wt %, at least 30 wt %, at least 40 wt %, or at least 50 wt % of the batch material, added as a super-addition. In further embodiments, the fugitive pore former may comprise less than 25 wt % of the batch material, such as less than 20 wt %, and further such as less than 15 wt %, and still further such as less than 10 wt % as a super-addition. In certain embodiments, the fugitive pore former may comprise from 5% to 20% of the batch material, such as from 5% to 15% of the batch material as a super-addition.

Methods disclosed herein can enable a reduction in the shrinkage variability of aluminum titanate honeycombs, wherein an aluminum titanate-forming batch material is prepared from batch components comprising at least one alkaline earth carbonate. The particle size distribution of the at least one alkaline earth carbonate is selected based on the predicted shrinkage during sintering of the aluminum titanate honeycombs.

The predicted shrinkage during sintering of the aluminum titanate honeycombs can be based on a number of factors. For example, the predicted shrinkage can be correlated to the particle size distribution of at least one alumina source used as a batch material to make the aluminum titanate honeycombs, as disclosed, for example, in Taruta, et al., "Influence of Aluminum Titanate Formation on Sintering of Bimodal Size-Distributed Alumina Powder Mixtures," *J. Am. Ceram. Soc.*, 80 [3], 551-56 (1997) and in US patent application no. 2011/0053757 the entire disclosures of which is incorporated herein by reference.

The predicted shrinkage can also be correlated to the particle size distribution of at least one titania source used as a batch material to make the aluminum titanate honeycombs, as disclosed, for example, in Wang, et al., "Microstructure of Ceramic Membrane Support from Corundum-rutile Powder Mixture," *Powder Technology*, 168, 125-133 (2006), the entire disclosure of which is incorporated herein by reference.

The predicted shrinkage can also be correlated to the particle size distribution of at least one fugitive pore forming source used in the manufacture of aluminum titanate honeycombs. For example, when the pore forming source comprises graphite, the predicted shrinkage can be correlated to the particle size distribution of the graphite, as disclosed, for example, in US patent application no. 2010/0052200, the entire disclosure of which is incorporated herein by reference.

Predicted shrinkage can also be a function of one or more processing parameters, such as forming parameters, drying parameters, and/or firing parameters.

One or more of the correlations discussed above can be inputted into a relationship, such as a mathematical algorithm, that can be used to predict the amount of shrinkage an aluminum titanate honeycomb body will experience during sintering under a given set of conditions. Such predicted shrinkage can then at least be partially compensated for using methods disclosed herein.

Parameters relating to the deviation of actual shrinkage characteristics from what is predicted can also be accounted for. In that manner, the amount of actual shrinkage that is not accounted for by the predicted shrinkage can be characterized or quantified. Such actual shrinkage can then at least be partially compensated for using methods disclosed herein.

For example, when the predicted or actual shrinkage is above a predetermined value, the particle size distribution of at least one alkaline earth carbonate can be selected such that the median particle size of the alkaline earth carbonate is higher than if the predicted shrinkage is at or below the predetermined value. Conversely, if the predicted shrinkage is below a predetermined value, the particle size distribution of at least one alkaline earth carbonate can be selected such that the median particle size of the alkaline earth carbonate is lower than if the predicted shrinkage is at or above the predetermined value.

For example, in certain exemplary embodiments, if the predicted or actual shrinkage is above a predetermined value, the particle size distribution of the at least one alkaline earth carbonate can be selected to have a median particle size that is at least 0.5 microns larger, such as at least 1.0 microns larger, and further such as at least 1.5 microns larger, including from 0.5 to 2.0 microns larger for every 0.1% the predicted or actual shrinkage is above the predetermined value. Conversely, in certain exemplary embodiments, if the predicted or actual shrinkage is below a predetermined value, the particle size distribution of the at least one alkaline earth carbonate can be selected to have a median particle size that is at least 0.5 microns smaller, such as at least 1.0 microns smaller, and further such as at least 1.5 microns smaller, including from 0.5 to 2.0 microns smaller for every 0.1% the predicted or actual shrinkage is below the predetermined value.

In certain exemplary embodiments, at least one alkaline earth carbonate is present in the batch composition in an amount ranging from 1% to 20%, such as from 3% to 15% and further such as from 5% to 10% by weight, based on the total weight of the inorganic solid components in the batch. Generally, the higher the percentage of alkaline earth carbonate in the batch composition, the greater the effect the median particle size of the alkaline earth carbonate may have on shrinkage.

For example, in one set of embodiments, at least one alkaline earth carbonate is present in the batch composition in an amount ranging from 5% to 10% by weight and, if the predicted or actual shrinkage is above a predetermined value, the particle size distribution of the at least one alkaline earth carbonate can be selected to have a median particle size that is from 0.5 to 2.0, such as from 0.7 to 1.5 microns larger for every 0.1% the predicted or actual shrinkage is above the predetermined value and, if the predicted or actual shrinkage is below a predetermined value, the particle size distribution of the at least one alkaline earth carbonate can be selected to have a median particle size that is from 0.5 to 2.0 microns smaller for every 0.1% the predicted or actual shrinkage is below the predetermined value.

In various exemplary embodiments, at least one alkaline earth carbonate has a first particle size distribution with a median particle size ($pd_{50}$) in the range of 0.2 to 2 microns, such as a range of 0.5 to 1.5 microns, and at least one alkaline earth carbonate has a second particle size distribution with a median particle size ($pd_{50}$) in the range of 15 to 30 microns, such as a range of 20 microns to 25 microns.

As used herein, the term $pd_{10}$ refers to a particle size wherein 90% of the particles in a distribution have a larger particle size and 10% of the particles in a distribution have a smaller particle size.

As used herein, the term $pd_{90}$ refers to a particle size wherein 90% of the particles in a distribution have a smaller particle size and 10% of the particles in a distribution have a larger particle size.

As used herein, the term $pd_{50}$ refers to a particle size where 50% of the particles in a distribution have a smaller particle size and 50% of the particles in a distribution have a larger particle size.

As used herein, the term pd factor $(pd_f) = (pd_{50} - pd_{10})/pd_{50}$.

As used herein, the term pd breadth $(pd_{breadth}) = (pd_{90} - pd_{10})/pd_{50}$.

In various exemplary embodiments, at least one alkaline earth carbonate has a first particle size distribution with a $pd_{10}$ in the range of 0.1 to 1 microns, such as a range of 0.25 to 0.75 microns, and at least one alkaline earth carbonate has a second particle size distribution with a $pd_{10}$ in the range of 8 to 18 microns, such as a range of 10 to 15 microns.

In various exemplary embodiments, at least one alkaline earth carbonate has a first particle size distribution with a $pd_{90}$ in the range of 0.5 to 3 microns, such as a range of 1 to 2.5 microns, and at least one alkaline earth carbonate has a second particle size distribution with a $pd_{90}$ in the range of 25 to 75 microns, such as a range of 30 to 60 microns.

In various exemplary embodiments, the first particle size distribution has a pd factor ($pd_f$) of less than 0.4, such as a $pd_f$ of from 0.25 to 0.35 and the second particle size distribution has a pd factor ($pd_f$) of less than 0.5, such as a $pd_f$ of from 0.35 to 0.45.

In various exemplary embodiments, the first particle size distribution has a $pd_{breadth}$ of less than 2, such as a $pd_{breadth}$ of from 1.3 to 1.7 and the second particle size distribution has a $pd_{breadth}$ of less than 2, such as a $pd_{breadth}$ of from 1.3 to 1.7.

In various exemplary embodiments, at least 25% by weight, such as at least 35% by weight, and further such as at least 50% by weight of the at least one alkaline earth carbonate has the first particle size distribution and at least 25% by weight, such as at least 35% by weight, and further such as at least 50% by weight of the at least one alkaline earth carbonate has the second particle size distribution.

For example, in various exemplary embodiments, from 25% to 75% by weight of the at least one alkaline earth carbonate has the first particle size distribution and from 25% to 75% by weight of the at least one alkaline earth carbonate has the second particle size distribution.

In certain exemplary embodiments, the weight ratio of the at least one alkaline earth carbonate having the first particle size distribution to the at least one alkaline earth carbonate having the second particle size distribution can range from 0.25:1 to 4:1, such as 0.5:1 to 2:1, and further such as 0.8:1 to 1.2 to 1, including about 1:1.

In certain exemplary embodiments, when the predicted or actual shrinkage is above a predetermined value, the particle size distribution of at least one alkaline earth carbonate can be selected such that a weight ratio of particles falling within the first particle size distribution to particles falling within the second particle size distribution is less than if the predicted or actual shrinkage is at or below the predetermined value. Conversely, when the predicted or actual shrinkage is below a predetermined value, the particle size distribution of at least one alkaline earth carbonate can be selected such that a weight ratio of particles falling within the first particle size distribution to particles falling within the second particle size distribution is greater than if the predicted or actual shrinkage is at or above the predetermined value.

In certain exemplary embodiments, the at least one alkaline earth carbonate having a first particle size distribution and a second particle size distribution is strontium carbonate.

In certain exemplary embodiments, the at least one alkaline earth carbonate having a first particle size distribution and a second particle size distribution is calcium carbonate.

In certain exemplary embodiments, the at least one alkaline earth carbonate having a first particle size distribution and a second particle size distribution is magnesium carbonate.

In certain exemplary embodiments, at least 25% by weight, such as at least 30% by weight, and further such as at least 35% by weight, and still further such as at least 40% by weight, and still yet further such as at least 45% by weight, and even still yet further such as at least 50% by weight of the at least one alkaline earth carbonate has a particle size of less than 2.5 microns and less than 10% by weight, such as less than 5% by weight, and further such as less than 2% by weight, and still further such as less than 1% by weight of the at least one alkaline earth carbonate has a particle size of between 2.5 and 10 microns.

For example, in certain exemplary embodiments from 25% to 75% by weight, such as from 30% to 60% by weight of the at least one alkaline earth carbonate has a particle size of less than 2.5 microns and from 1% to 10% by weight such as from 2% to 8% by weight of the at least one alkaline earth carbonate has a particle size of between 2.5 and 10 microns.

In various embodiments, methods disclosed herein may further include reducing the variability in the particle size distribution of at least one alkaline earth carbonate comprising an inorganic batch component. As used herein, the term "reducing the variability in the particle size distribution" is intended to mean that various particle size parameters characterizing the material vary less from the standard or specifications for that material than is conventionally used. For example, in various embodiments of the disclosure, the median particle size ($pd_{50}$) of an alkaline earth carbonate particle size distribution may vary by about ±4 μm or less, such as about ±2 μm or less or about ±1 μm or less. In other embodiments, the $pd_{10}$ of an alkaline earth carbonate particle size distribution may vary by about ±0.5 μm or less, such as about ±0.25 μm or less or about ±0.125 μm or less. And, in other embodiments, the $pd_{90}$ of an alkaline earth carbonate particle size distribution may vary by about ±10 μm or less, such as about ±5 μm or less or about ±2.5 μm or less.

Reducing the variability in the particle size distribution of at least one alkaline earth carbonate can be accomplished by methods known to those of skill in the art and include, micronizing, milling, grinding, and/or classifying. For example, fine strontium carbonate (e.g., having a $pd_{50}$ of less than 5 microns) often contains agglomerates, which both raise the $pd_{50}$ as well as the distribution (e.g., $pd_f$ and $pd_{breadth}$). Breaking up these agglomerates by micronization or by other means acts to lower the $pd_{50}$ of the resulting distribution as well as reduce the variability of the distribution itself.

EXAMPLES

Example 1

In order to understand the relationship between shrinkage and particle size characteristics of alkaline earth carbonate added as a batch constituent, dilatometry curves were collected for samples made from batches containing coarse strontium carbonate having a median particle size of about 10.1 microns and fine strontium carbonate having a median particle size of about 5.3 microns. The batches all otherwise contained the same combination of raw inorganic ingredients, namely alumina, titania, silica, strontium carbonate, calcium carbonate, and lanthanum oxide, which were added within the ranges of the weight percentages set forth above with reference to U.S. Pat. No. 7,259,120. Each of the raw inorganic ingredients were added in the same weight percentages in each of the batches and each of the batches had the same binder (methylcellulose) added in the same weight percentage and the same water call. Following extrusion to honeycomb-shaped bodies (5.66" diameter and 8.5" long) and drying, samples having dimensions of about ¼" by ¼" by 1" were cut from the green bodies. Dilatometry testing was then carried out by heating the samples from room temperature to 1420° C. at 1° C. per minute in air. Results of the dilatometry experiments are shown in FIG. 1 and indicate a significant difference between use of coarse and fine strontium carbonate between temperatures of about 950° C. and 1000° C. At this temperature, the strontium carbonate is decomposing to SrO and $CO_2$. The coarse strontium carbonate appears to have a relatively delayed decomposition reaction and increased growth, as indicated by the dashed curves. At this temperature, the ware is very weak and susceptible to cracking. Accordingly, use of relatively fine strontium carbonate may reduce cracking associated with dimensional changes occurring at this stage of a firing cycle.

In order to test this hypothesis, sample parts having 300 cells per square inch and 13 mil thick walls, having ACT cell geometry as described in U.S. Pat. No. 6,696,132, with green dimensions of 5.66" diameter by 8.5" length were made using the batch compositions as described above, including being pulsed with coarse and fine strontium carbonate as described above (median particle sizes of about 10.1 and 5.3 microns, respectively) Parts were subsequently fired and measured for shrinkage and other physical properties.

Figure 2:
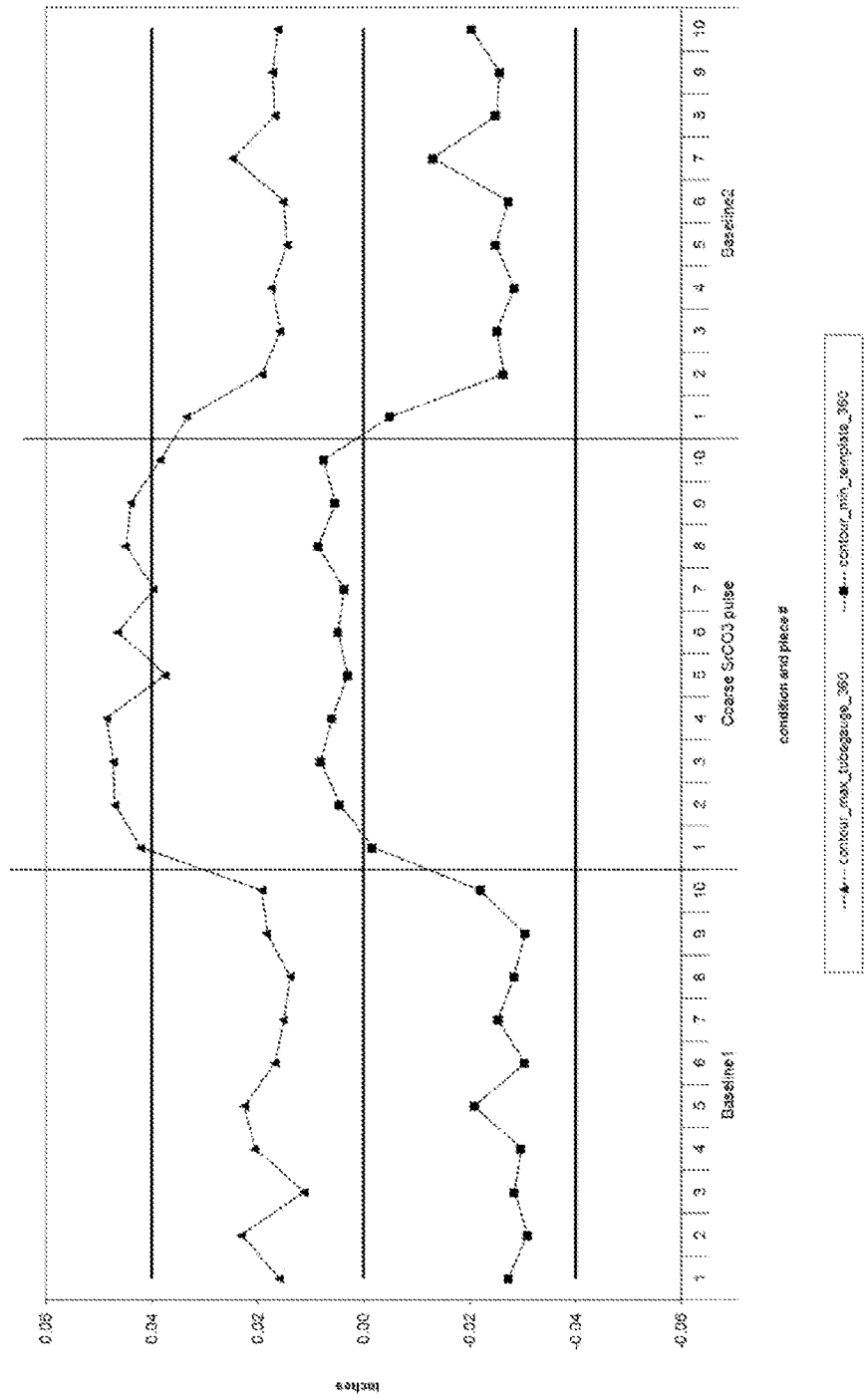
FIG. 2 plots template and tubegauge characteristics of fired aluminum titanate parts in which strontium carbonate having either coarse or fine particle sizes was added as a batch constituent.

Shrinkage associated dimensional geometric characteristics (specifically template and tubegauge) of fired parts pulsed with relatively coarse and fine strontium carbonate are shown in FIG. 2. As can be seen from FIG. 2, use of the relatively coarse strontium carbonate caused a drop in shrinkage, specifically a drop of about 0.4%, such that fired dimensions shifted larger by about 0.020".

Average physical properties of the samples used to generate the data shown in FIG. 2 are set forth in Table 1 (wherein the ±value indicates a standard deviation).

TABLE 1

| | Relatively fine $SrCO_3$ ($pd_{50} \approx 5.3$ μm) $SrCO_3$ | Relatively coarse ($pd_{50} \approx 10.1$ μm) $SrCO_3$ | Relatively fine ($pd_{50} \approx 5.3$ μm) $SrCO_3$ |
|---|---|---|---|
| MOR (psi) | 256 ± 7.3 | 253 ± 12.9 | 258 ± 10.9 |
| CTE (25-800° C. × $10^{-7}$/° C.) | 4.6 ± 0.53 | 4.6 ± 0.34 | 5.0 ± 0.30 |
| Modulus of elasticity ($10^6$ psi) | 0.26 ± 0.009 | 0.24 ± 0.011 | 0.25 ± 0.015 |
| Porosity (%) | 50.36 ± 0.33 | 51.09 ± 0.80 | 50.58 ± 0.23 |
| $D_{50}$ | 15.2 ± 0.12 | 15.5 ± 0.24 | 15.2 ± 0.16 |

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for controlling shrinkage of aluminum titanate honeycombs, comprising:
    preparing an aluminum titanate-forming batch material comprising inorganic batch components comprising at least one alkaline earth carbonate;
    calculating a shrinkage during sintering of the aluminum titanate honeycombs to determine a predicted shrinkage; and
    selecting a particle size distribution of the at least one alkaline earth carbonate based on the predicted shrinkage to control the shrinkage during sintering of the aluminum titanate honeycombs to at least partially compensate for the predicted shrinkage,
    wherein the at least one alkaline earth carbonate has a first particle size distribution with a median particle size ($pd_{50}$) in the range of 0.2 to 2 microns and the at least one alkaline earth carbonate has a second particle size distribution with a median particle size ($pd_{50}$) in the range of 15 to 30 microns.

2. The method of claim 1, wherein the inorganic batch components comprise at least one alumina source having a particle size distribution and at least one titania source having a particle size distribution, and the calculating comprises correlating the shrinkage during sintering of the aluminum titanate honeycombs to the particle size distribution of the at least one alumina source and/or the particle size distribution of the at least one titania source.

3. The method of claim 1, wherein the aluminum titanate-forming batch material further comprises at least one pore forming source, the at least one pore forming source comprising graphite having a particle size distribution, wherein the calculating comprises correlating the shrinkage during sintering of the aluminum titanate honeycombs to the particle size distribution of the graphite.

4. The method of claim 1, wherein, if the predicted shrinkage is above a predetermined value, the particle size distribution of the at least one alkaline earth carbonate is selected such that the median particle size of the at least one alkaline earth carbonate is higher than if the predicted shrinkage is at or below the predetermined value.

5. The method of claim 1, wherein, if the predicted shrinkage is below a predetermined value, the particle size distribution of the at least one alkaline earth carbonate is selected such that the median particle size of the at least one alkaline earth carbonate is lower than if the predicted shrinkage is at or above the predetermined value.

6. The method of claim 1, wherein, if the predicted shrinkage is above a predetermined value, the particle size distribution of the at least one alkaline earth carbonate is selected such that a weight ratio of particles falling within the first particle size distribution to particles falling within the second particle size distribution is less than if the predicted shrinkage is at or below the predetermined value.

7. The method of claim 1, wherein, if the predicted shrinkage is below a predetermined value, the particle size distribution of the at least one alkaline earth carbonate is selected such that a weight ratio of particles falling within the first particle size distribution to particles falling within the second particle size distribution is greater than if the predicted shrinkage is at or above the predetermined value.

8. The method of claim 1, wherein the at least one alkaline earth carbonate comprises a particle size distribution having a $pd_f$ of less than 0.4 and a $pd_{breadth}$ of less than 2.

9. The method of claim 1, wherein the at least one alkaline earth carbonate is strontium carbonate.

10. A method for controlling shrinkage of aluminum titanate honeycombs, comprising:

preparing an aluminum titanate-forming batch material comprising inorganic batch components comprising at least one alkaline earth carbonate;

calculating a shrinkage during sintering of the aluminum titanate honeycombs to determine a predicted shrinkage; and selecting a particle size distribution of the at least one alkaline earth carbonate based on the predicted shrinkage to control the shrinkage during sintering of the aluminum titanate honeycombs to at least partially compensate for the predicted shrinkage, wherein the at least one alkaline earth carbonate has a first particle size distribution with a median particle size ($pd_{50}$) in the range of 0.2 to 2 microns and the at least one alkaline earth carbonate has a second particle size distribution with a median particle size ($pd_{50}$) in the range of 15 to 30 microns, wherein the controlled shrinkage is within a predetermined value range of shrinkage during sintering of the aluminum titanate honeycombs.

11. A method for controlling shrinkage of aluminum titanate honeycombs, comprising:

preparing an aluminum titanate-forming batch material comprising inorganic batch components comprising strontium carbonate;

calculating a shrinkage during sintering of the aluminum titanate honeycombs to determine a predicted shrinkage; and selecting a particle size distribution of the strontium carbonate based on the predicted shrinkage to control the shrinkage during sintering of the aluminum titanate honeycombs to at least partially compensate for the predicted shrinkage, wherein the strontium carbonate comprises a particle size distribution having a $pd_f$ of less than 0.4 and a $pd_{breadth}$ of less than 2.

* * * * *

UNITED STATES PATENT AND TRADEMARK OFFICE
CERTIFICATE OF CORRECTION

| | |
|---|---|
| PATENT NO. | : 9,475,734 B2 |
| APPLICATION NO. | : 13/484629 |
| DATED | : October 25, 2016 |
| INVENTOR(S) | : Daniel Edward McCauley et al. |

It is certified that error appears in the above-identified patent and that said Letters Patent is hereby corrected as shown below:

On the Title Page

In item (57), in Column 2, in "Abstract", Line 3, delete "least" and insert -- at least --.

Signed and Sealed this
First Day of August, 2023

Katherine Kelly Vidal
*Director of the United States Patent and Trademark Office*